United States Patent
Ito et al.

(10) Patent No.: US 11,258,065 B2
(45) Date of Patent: Feb. 22, 2022

(54) ENERGY STORAGE DEVICE

(71) Applicant: GS Yuasa International Ltd., Kyoto (JP)

(72) Inventors: Shota Ito, Kyoto (JP); Kenta Nakai, Kyoto (JP); Akihiko Miyazaki, Kyoto (JP); Tomonori Kako, Kyoto (JP); Sumio Mori, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 289 days.

(21) Appl. No.: 16/069,929

(22) PCT Filed: Jan. 13, 2017

(86) PCT No.: PCT/JP2017/000908
§ 371 (c)(1),
(2) Date: Jul. 13, 2018

(87) PCT Pub. No.: WO2017/122759
PCT Pub. Date: Jul. 20, 2017

(65) Prior Publication Data
US 2019/0027753 A1    Jan. 24, 2019

(30) Foreign Application Priority Data
Jan. 15, 2016  (JP) ............................. JP2016-006215

(51) Int. Cl.
*H01M 4/02*     (2006.01)
*H01G 11/06*    (2013.01)
(Continued)

(52) U.S. Cl.
CPC ............ *H01M 4/587* (2013.01); *H01G 11/06* (2013.01); *H01G 11/26* (2013.01); *H01G 11/32* (2013.01);
(Continued)

(58) Field of Classification Search
CPC ...... H01M 4/587; H01M 4/13; H01M 10/058; H01M 10/0525; H01M 2004/021;
(Continued)

(56) References Cited

U.S. PATENT DOCUMENTS 5,698,339 A * 12/1997 Kawakami ............ H01M 4/624
429/212
2005/0221185 A1  10/2005 Tanabe
(Continued)

FOREIGN PATENT DOCUMENTS

CN    102983355 A    3/2013
JP     8171901 A2    7/1996
(Continued)

OTHER PUBLICATIONS

Extended European Search Report (EESR) dated Aug. 5, 2019 issued in the corresponding European patent application No. 17738511.9.

(Continued)

*Primary Examiner* — Christian Roldan
(74) *Attorney, Agent, or Firm* — Rankin, Hill & Clark LLP

(57) ABSTRACT

An energy storage device includes: a positive electrode plate containing a positive composite layer including a positive active material capable of occluding and releasing a lithium ion; and a negative electrode plate containing a negative composite layer including a negative active material capable of occluding and releasing a lithium ion. A peak pore diameter Rp of the positive composite layer in a pore distribution measured by a mercury penetration method is 0.5 μm or less, and a peak pore diameter Rn of the negative composite layer in a pore distribution measured by a mercury penetration method is 0.5 μm or less. A ratio Rp/Rn of the peak pore diameter of the positive composite layer to the
(Continued)

peak pore diameter of the negative composite layer is 0.60 or more and 1.70 or less.

6 Claims, 2 Drawing Sheets

(51) Int. Cl.

| | | |
|---|---|---|
| *H01M 4/587* | (2010.01) | |
| *H01M 10/0525* | (2010.01) | |
| *H01M 4/13* | (2010.01) | |
| *H01M 10/058* | (2010.01) | |
| *H01G 11/42* | (2013.01) | |
| *H01G 11/32* | (2013.01) | |
| *H01G 11/26* | (2013.01) | |
| *H01G 11/50* | (2013.01) | |
| *H01G 11/24* | (2013.01) | |

(52) U.S. Cl.
CPC ............ *H01G 11/42* (2013.01); *H01G 11/50* (2013.01); *H01M 4/13* (2013.01); *H01M 10/058* (2013.01); *H01M 10/0525* (2013.01); *H01G 11/24* (2013.01); *H01M 2004/021* (2013.01); *H01M 2004/027* (2013.01); *Y02E 60/10* (2013.01); *Y02T 10/70* (2013.01)

(58) Field of Classification Search
CPC . H01M 2004/027; H01G 11/42; H01G 11/32; H01G 11/26; H01G 11/50; H01G 11/06; H01G 11/24; Y02T 10/7011; Y02E 60/122

USPC ........................................................ 429/231
See application file for complete search history.

(56) References Cited

U.S. PATENT DOCUMENTS

| | | | |
|---|---|---|---|
| 2009/0253033 A1 | 10/2009 | Hirose | |
| 2010/0012403 A1* | 1/2010 | Fujita | .................... H01M 4/133 |
| | | | 180/65.1 |
| 2014/0272562 A1 | 9/2014 | Watanabe | |
| 2016/0049637 A1 | 2/2016 | Sohn et al. | |

FOREIGN PATENT DOCUMENTS

| | | |
|---|---|---|
| JP | 2004-47239 A | 2/2004 |
| JP | 2005317493 A2 | 11/2005 |
| JP | 2006059690 | 3/2006 |
| JP | 2009252580 A2 | 10/2009 |
| JP | 2010073420 A2 | 4/2010 |
| JP | 2011003551 A2 | 1/2011 |
| JP | 2012064544 A2 | 3/2012 |
| JP | 2012079651 A2 | 4/2012 |
| JP | 5060289 | 10/2012 |
| JP | 2012209161 A2 | 10/2012 |
| JP | 2012216500 A2 | 11/2012 |
| JP | 2014179240 A2 | 9/2014 |
| WO | 2006129756 A1 | 12/2006 |

OTHER PUBLICATIONS

International Search Report dated Feb. 14, 2017 filed in PCT/JP2017/000908.

\* cited by examiner

ENERGY STORAGE DEVICE

TECHNICAL FIELD

The technology described in the present specification relates to an energy storage device.

BACKGROUND ART

Conventionally, an energy storage device including a positive electrode, a negative electrode, and a nonaqueous electrolyte is known (see Patent Document 1). The positive electrode is formed by forming a positive composite layer containing a positive active material capable of absorbing and releasing lithium ions on the surface of a metal positive current collector. The negative electrode is formed by forming a negative composite layer containing a negative active material capable of absorbing and releasing lithium ions on the surface of a metal negative current collector.

During charging of the energy storage device, lithium ions are released from the positive active material, the lithium ions are diffused in the positive composite layer, and the lithium ions are released from the positive composite layer into the nonaqueous electrolyte. The lithium ions penetrate into the negative composite layer from the nonaqueous electrolyte, diffuse through the negative composite layer, and are absorbed in the negative active material.

Conversely, during discharging of the energy storage device, lithium ions follow a path, opposite to the above-mentioned path, from the negative active material to the positive active material.

PRIOR ART DOCUMENT

Patent Document

Patent Document 1: JP-A-2009-252580

SUMMARY OF THE INVENTION

Problems to be Solved by the Invention

In the energy storage device according to the above configuration, when the diffusion rate of lithium ions in the positive composite layer is greatly different from the diffusion rate of lithium ions in the negative composite layer, there is a concern about arising of the problem that the endurance capacity retention ratio of the energy storage device decreases, which is explained below.

For example, a case is assumed in which the diffusion rate of lithium ions in the positive composite layer is significantly larger than the diffusion rate of lithium ions in the negative composite layer. In this case, at the time of charging, the lithium ions released from the positive active material promptly diffuse through the positive composite layer and are released into the nonaqueous electrolyte. However, after penetrating into the negative composite layer, the lithium ions stay in the negative composite layer. Then, there is a concern that polarization due to uneven distribution of lithium ions may occur between the positive electrode and the negative electrode.

Polarization due to uneven distribution of lithium ions can also occur during discharge. Also, polarization due to uneven distribution of lithium ions can occur when the diffusion rate of lithium ions in the positive composite layer is significantly lower than the diffusion rate of lithium ions in the negative composite layer.

When polarization due to uneven distribution of lithium ions occurs, it is feared that a part of the composite layer in which the polarization occurs may reach a high potential or a low potential which is not supposed. As a result, problems may occur such as precipitation of lithium metal, cracking of the composite layer, or decomposition of the nonaqueous electrolyte more than anticipated. Thereby, it is supposed that the endurance capacity retention ratio of the energy storage device is lowered.

The technology described in this specification was achieved based on the above-mentioned circumstances. It is an object of the present invention to provide an energy storage device with improved endurance capacity retention ratio.

Means for Solving the Problems

An energy storage device according to an embodiment of technology described in this specification includes: a positive electrode containing a positive composite layer including a positive active material capable of occluding and releasing a lithium ion; and a negative electrode containing a negative composite layer including a negative active material capable of occluding and releasing a lithium ion. The negative active material contains amorphous carbon. A peak pore diameter $Rp$ of the positive composite layer in a pore distribution measured by a mercury penetration method is 0.5 μm or less. A peak pore diameter $Rn$ of the negative composite layer in a pore distribution measured by a mercury penetration method is 0.5 μm or less. A ratio $Rp/Rn$ of the peak pore diameter of the positive composite layer to the peak pore diameter of the negative composite layer is 0.60 or more and 1.70 or less.

According to the embodiment of the technology described in this specification, an endurance capacity retention ratio of the energy storage device can be improved. The reason is considered as follows.

First, by setting the ratio $Rp/Rn$ of the peak pore size of the positive composite layer to the peak pore size of the negative composite layer to 0.60 or more and 1.70 or less, the peak pore size $Rp$ of the positive composite layer and the peak pore size $Rn$ of the negative composite layer are relatively close to each other. Thereby, the diffusion rate of lithium ions in the positive composite layer and the diffusion rate of lithium ions in the negative composite layer are relatively close to each other. As a result, occurrence of large polarization due to uneven distribution of lithium ions is suppressed in either the positive electrode or the negative electrode. Further, by using amorphous carbon of which volume change associated with the insertion/extraction of lithium ions is smaller than that of graphite, the change in the peak pore size of the negative composite layer can be reduced from the initial stage, and good diffusion of lithium ions can be maintained.

Thereby, problems such as precipitation of lithium metal, cracking of the composite layer, and excessive decomposition of the nonaqueous electrolyte can be suppressed. As a result, it is possible to improve the endurance capacity retention ratio of the energy storage device.

Further, by setting the peak pore size $Rp$ of the positive composite layer and the peak pore size $Rn$ of the negative composite layer to 0.5 μm or less, the endurance capacity retention ratio can be improved. When the peak pore size $Rp$ of the positive composite layer and the peak pore size $Rn$ of the negative composite layer are larger than 0.5 μm, the voids among the active materials in the composite layer increase, and therefore the electric resistance value increases in the composite layers. Then, it is presumed that large polarization occurs locally in a part of the composite layer.

Advantages of the Invention

According to the technology described in this specification, an endurance capacity retention ratio of an energy storage device can be improved.

MODE FOR CARRYING OUT THE INVENTION

Summary of Embodiments

Figure 1:
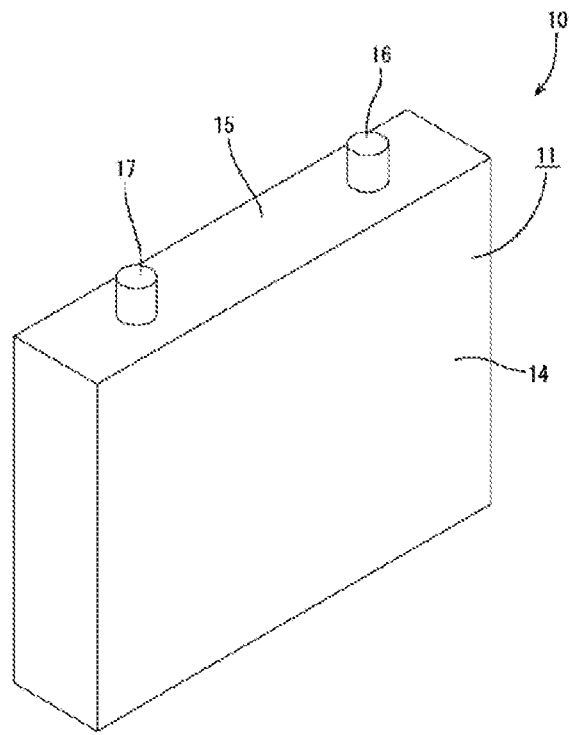
FIG. 1 is a perspective view of an energy storage device according to Embodiment 1.

An energy storage device according to an embodiment of technology described in this specification includes: a positive electrode containing a positive composite layer including a positive active material capable of occluding and releasing a lithium ion; and a negative electrode containing a negative composite layer including a negative active material capable of occluding and releasing a lithium ion. The negative active material contains amorphous carbon. A peak pore diameter Rp of the positive composite layer in a pore distribution measured by a mercury penetration method is 0.5 μm or less. A peak pore diameter Rn of the negative composite layer in a pore distribution measured by a mercury penetration method is 0.5 μm or less. A ratio Rp/Rn of the peak pore diameter of the positive composite layer to the peak pore diameter of the negative composite layer is 0.60 or more and 1.70 or less.

According to the embodiment of the technology described in this specification, an endurance capacity retention ratio of the energy storage device can be improved. The reason is considered as follows.

First, by setting the ratio Rp/Rn of the peak pore size of the positive composite layer to the peak pore size of the negative composite layer to 0.60 or more and 1.70 or less, the peak pore size Rp of the positive composite layer and the peak pore size Rn of the negative composite layer Is relatively close to each other. Thereby, the diffusion rate of lithium ions in the positive composite layer and the diffusion rate of lithium ions in the negative composite layer are relatively close to each other. As a result, occurrence of large polarization due to uneven distribution of lithium ions is suppressed in either the positive electrode or the negative electrode. Further, by using amorphous carbon whose volume change associated with the insertion/extraction of lithium ions is smaller than that of graphite, the change in the peak pore size of the negative composite layer can be reduced from the initial stage, and good diffusion of lithium ions can be maintained.

Thereby, problems such as precipitation of lithium metal, cracking of the composite layer, and excessive decomposition of the nonaqueous electrolyte can be suppressed. As a result, it is possible to improve the endurance capacity retention ratio of the energy storage device.

Further, by setting the peak pore size Rp of the positive composite layer and the peak pore size Rn of the negative composite layer to 0.5 μm or less, the endurance capacity retention ratio can be improved. When the peak pore size Rp of the positive composite layer and the peak pore size Rn of the negative composite layer are larger than 0.5 μm, the voids among the active materials in the composite layer increase, and therefore the electric resistance value increases in the composite layers. Then, it is presumed that large polarization occurs locally in a part of the composite layer.

In the embodiment of the technology described in this specification, a configuration can be adopted in which the ratio Rp/Rn of the peak pore diameter of the positive composite layer to the peak pore diameter of the negative composite layer is 0.67 or more and 1.50 or less in the above energy storage device.

According to the embodiment, the endurance capacity retention ratio of the energy storage device can be further improved. The reason for this is that the difference between the peak pore size Rp of the positive composite layer and the peak pore size Rn of the negative composite layer becomes smaller.

In an embodiment of the technology described in this specification, a configuration can be adopted in which the ratio Rp/Rn of the peak pore diameter of the positive composite layer to the peak pore diameter of the negative composite layer is 0.78 or more and 1.27 or less in the energy storage device.

According to the embodiment, the endurance capacity retention ratio of the energy storage device can be further improved. The reason for this is that the difference between the peak pore size Rp of the positive composite layer and the peak pore size Rn of the negative composite layer is further reduced.

In an embodiment of the technology described in this specification, a configuration can be adopted in which the ratio Rp/Rn of the peak pore diameter of the positive composite layer to the peak pore diameter of the negative composite layer is 0.98 or more and 1.27 or less in the energy storage device.

According to the embodiment, the endurance capacity retention ratio of the energy storage device can be particularly improved. The reason for this is that the difference between the peak pore size Rp of the positive composite layer and the peak pore size Rn of the negative composite layer is particularly reduced.

In an embodiment of the technology described in this specification, a configuration can be adopted in which a D50 particle diameter of the positive active material is 5 μm or less, a D50 particle diameter of the negative active material is 5 μm or less, the peak pore diameter of the positive composite layer is 0.2 μm or more, and the peak pore diameter of the negative composite layer is 0.2 μm or more in the energy storage device.

According to the embodiment, an initial power performance of the energy storage device can be improved. This is thought to be due to the following reason. First, by setting the D50 particle diameter of the positive active material and the D50 particle diameter of the negative active material to 5 μm or less, it is possible to improve the power of the positive active material and the negative active material. Further, by setting the peak pore size of the positive composite layer and the peak pore size of the negative composite layer to 0.2 μm or more, it is possible to improve the lithium ion diffusion performance in the positive composite layer and the negative composite layer. Thereby, a high power performance of the energy storage device can be improved.

In an embodiment of the technology described in this specification, a configuration can be adopted in which the D50 particle diameter of the positive active material is 2 µm or more, and a D50 particle diameter of the negative active material is 2 µm or more in the energy storage device.

According to the embodiment, mass productivity of the positive active material and the negative active material can be improved. The reason for this is that it becomes difficult to handle such that the positive active material and the negative active material are likely to scatter when the D50 particle diameter of the positive active material and the D50 particle diameter of the negative active material becomes smaller than 2 µm.

In an embodiment of the technology described in this specification, a configuration can be adopted in which the negative active material contains non-graphitizable carbon in the energy storage device.

According to the above aspect, since non-graphitizable carbon (hard carbon) having smaller volume change associated with insertion/extraction of lithium ions is used among amorphous carbon, change in peak pore size of the negative composite layer can be further reduced from the initial stage, good diffusion of lithium ions can be further maintained, and the endurance capacity retention ratio of the energy storage device can be improved.

Embodiment 1

Embodiment 1 of the technique described herein will be described with reference to FIGS. 1 to 2. The energy storage device 10 according to Embodiment 1 is mounted on a vehicle (not shown) such as an electric vehicle and a hybrid car, for example, and is used as a power source. The energy storage device 10 according to Embodiment 1 is a lithium ion battery, in which a positive electrode plate 12 (corresponding to a positive electrode), a negative electrode plate 13 (corresponding to a negative electrode), a separator, and a nonaqueous electrolyte are housed in a case 11. Note that the energy storage device 10 is not limited to a lithium-ion battery, and any storage battery can be selected as required.

As shown in FIG. 1, the case 11 has a flat rectangular parallelepiped shape. The case 11 may be made of metal, or may be made of synthetic resin. As the metal forming the case 11, any metal such as iron, an iron alloy, aluminum, or an aluminum alloy can be selected as required. As the synthetic resin forming the case 11, any synthetic resin of polypropylene (PP), polyethylene (PE), and the like can be selected as required.

(Case 11)

The case 11 includes a case main body 14 that opens upward and a lid 15 that is attached to the case main body 14 and that closes the opening of the case main body 14. The lid 15 is formed in substantially the same shape as the opening of the case main body 14. On the upper surface of the lid 15, a positive electrode terminal 16 and a negative electrode terminal 17 are provided to protrude upward. The positive electrode terminal 16 is electrically connected to the positive electrode plate 12 in the case 11 by a publicly known method. Further, the negative electrode terminal 17 is electrically connected to the negative electrode plate 13 in the case 11 by a publicly known method.

Figure 2:
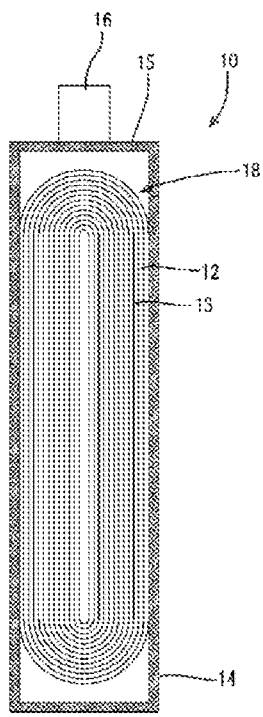
FIG. 2 is a cross-sectional view showing an energy storage device.

As shown in FIG. 2, in the case 11, an energy storage element 18 obtained by laminating the positive electrode plate 12, the separator, the negative electrode plate 13, and the separator in this order and winding them all is housed. Further, an electrolyte solution (not shown) is injected into the case 11.

(Positive Electrode Plate 12)

The positive electrode plate 12 includes a positive composite layer(s) on one surface or both surfaces of a positive electrode foil. The positive composite layer includes a positive active material, a conduction aid and a positive electrode binder as a binder. The positive electrode foil is in a shape of metal foil. The positive electrode foil according to the embodiment is made of aluminum or aluminum alloy.

As the positive active material, publicly known materials can be appropriately used as long as the positive active material is capable of occluding and releasing a lithium ion. For example, as the positive electrode material, a lithium metal oxide represented by $Li_{1-x}Ni_aCo_bMn_cM_dO_{2-\delta}$ (an element or a combination of two or more elements selected from B, Mg, Al, Ti, V, Zn, Y, Zr, Mo and W may be included inside or outside an active material, and $0 \leq (a, b, c, d) \leq 1$ and $a+b+c+d=1$ are satisfied) and a compound such $LiMPO_4$, $LiMSiO_4$, $LiMBO_3$ (M is one or more transition metal element selected from Fe, Ni, Mn, Co or the like) can be used. $Li_{1-x}Ni_aCo_bMn_cM_dO_{2-\delta}$ (an element or a combination of two or more elements selected from B, Mg, Al, Ti, V, Zn, Y, Zr, Mo and W may be included inside or outside an active material, and $0 \leq (a, b, c, d) \leq 1$ and $a+b+c+d=1$ are satisfied) is preferable in view of an energy density.

A type of the conduction aid is not limited and may be a metal or a non-metal. As a metal conduction aid, a material comprising a metal element such as Cu, Ni or the like can be used. As a non-metal conduction aid, a carbon material such as graphite, carbon black, acetylene black and Ketchen black can be used.

The positive electrode binder is not particularly limited as long as the positive electrode binder is stable against a solvent and an electrolyte used at the time of manufacturing the electrode, and is stable against oxidation-reduction reaction at the time of charge-discharge. For example, a thermoplastic resin such as polytetrafluoroethylene(PTFE), polyvinylidene fluoride (PVDF), polyethylene, polypropylene; and a polymer having a rubber elasticity such as ethylene-propylene-diene terpolymer (EPDM), sulfonated EPDM, styrene-butadiene rubber (SBR) and fluororubber can be used singly or in a mixture of two or more thereof.

Further, as necessary, a positive electrode thicker may be contained in the positive composite. As the positive electrode thicker, any compound such as a cellulose-based resin and acrylic acid can be appropriately selected as required. As the cellulose-based resin, carboxymethyl cellulose (CMC), methyl cellulose (MC), hydroxymethyl cellulose, ethyl cellulose or the like can be appropriately selected.

A positive electrode paste is prepared by mixing a positive active material, a conduction aid, a positive electrode binder, a positive electrode thickener, and a solvent. The positive electrode paste is applied to one surface or both surfaces of the positive electrode foil by a publicly known method such as a reverse roll method, a direct roll method, a blade method, a knife method, or a clipping method.

Thereafter, a drying step is performed on the positive electrode plate 12. The positive electrode plate 12 is pressed to a predetermined thickness after the drying step is completed.

(Negative Electrode Plate 13)

The negative electrode plate 13 has negative composite layers on one surface or both surfaces of a negative electrode foil. The negative composite layer includes a negative active material, a negative electrode binder as a binder, and a negative electrode thickener. The negative electrode foil is in the shape of a metal foil. The negative electrode foil according to the present embodiment is made of copper or a copper alloy.

As the negative active material, amorphous carbon is used. In addition, it is possible to adequately mix publicly known negative active materials capable of absorbing and releasing lithium ions such as graphite with the amorphous carbon, but it is preferred to use amorphous carbon as a main component, or to mix the negative active materials with the amorphous carbon to such an extent that the effect of the invention is not lost. Examples of the amorphous carbon include non-graphitizable carbon (hard carbon) and graphitizable carbon (soft carbon), but it is possible to particularly suitably use non-graphitizable carbon (hard carbon). The reason for this is that the non-graphitizable carbon (hard carbon) is small in volume change associated the insertion/extraction of lithium ions even among amorphous carbons. Here, the amorphous carbon is defined as a carbon in which the interplanar spacing of the (002) plane measured from the wide angle X-ray diffraction method in the discharge state of the electrode is 0.340 nm or more, and the non-graphitizable carbon is defined as a carbon in which the interplanar spacing of the (002) plane measured from the wide angle X-ray diffraction method in the discharge state of the electrode is 0.350 nm or more.

Further, as necessary, a conduction aid may be contained in the negative composite. The type of the conduction aid is not particularly limited and may be a metal or a non-metal. As the metal conductive agent, a material composed of a metal element such as Cu or Ni can be used. As the non-metal conductive agent, carbon materials such as graphite, carbon black, acetylene black, and ketjen black can be used.

The kind of the negative electrode binder is not particularly limited as long as it is stable with respect to a solvent and an electrolyte solution used at the time of manufacturing the electrode and is stable against an oxidation-reduction reaction at the time of charge-discharge. For example, thermoplastic resins such as polytetrafluoroethylene (PTFE), polyvinylidene fluoride (PVDF), polyethylene, and polypropylene, and polymer having rubber elasticity such as ethylene-propylene-diene terpolymer (EPDM), sulfonated EPDM, styrene butadiene rubber (SBR), and fluororubber can be used singly or in a mixture of two or more thereof.

As the negative electrode binder, a so-called nonaqueous binder may be used, or a so-called aqueous binder may be used. In consideration of environmental problems, the aqueous binder can be suitably used. The aqueous binder includes a water-dispersible binder that does not dissolve in water but is well dispersed in water and a water-soluble binder that is soluble in water.

Also, the negative composite contains a negative electrode thickener. As the negative electrode thickener, any compound such as a cellulose-based resin and acrylic acid can be appropriately selected as required. As the cellulose-based resin, carboxymethyl cellulose (CMC), methyl cellulose (MC), hydroxymethyl cellulose, ethyl cellulose, and the like can be appropriately selected. From the viewpoint of increasing the peeling strength of the negative active material layer, it is preferred to use the cellulose-based resin as the negative electrode thickener, and particularly preferred to use carboxymethyl cellulose.

A negative electrode paste is prepared by mixing a negative active material, a conduction aid, a negative electrode binder, a negative electrode thickener, and a solvent. The negative electrode paste is applied to one surface or both surfaces of the negative electrode foil by a publicly known method such as a reverse roll method, a direct roll method, a blade method, a knife method, or a clipping method.

Thereafter, a drying step is performed on the negative electrode plate 13. The negative electrode plate 13 is pressed to a predetermined thickness after the drying step is completed.

(Separator)

As the separator, microporous polyolefin membranes, woven fabrics or nonwoven fabrics made of synthetic resins, woven fabrics or nonwoven fabrics of natural fibers, glass fibers or ceramic fibers, paper, and the like can be used. As the microporous polyolefin membrane, polyethylene, polypropylene, or a composite membrane thereof can be used. The synthetic resin fiber can be selected from polyacrylonitrile (PAN), polyamide (PA), polyester, polyethylene terephthalate (PET), polyolefin such as polypropylene (PP) or polyethylene (PE), or a mixture thereof. A thickness of the separator is preferably 5 to 35 μm.

A heat-resistant layer containing heat-resistant particles and a binder may be formed on at least one surface of the separator. When a heat-resistant layer is formed on the separator, it is preferred that the heat-resistant layer be disposed to face the positive composite layer. The heat-resistant particles preferably have a weight loss of 5% or less by heating at 500° C. in the atmosphere. In particular, it is preferable that the weight loss by heating at 800° C. be 5% or less. Such materials include an inorganic compound. The inorganic compound is made of one or more of the following inorganic substances alone or in combination or composite compound. Examples of the above-mentioned inorganic compounds include oxide fine particles of iron oxide, $SiO_2$, $Al_2O_3$, $TiO_2$, $BaTiO_2$, $ZrO$, alumina-silica composite oxide, or the like; nitride fine particles of aluminum nitride, silicon nitride, or the like; hardly soluble ionic-crystal fine particles of calcium fluoride, barium fluoride, barium sulfate, or the like; covalent crystal fine particles of silicon, diamond, or the like; clay fine particles of talc, montmorillonite, or the like; substances derived from mineral resources such as boehmite, zeolite, apatite, kaolin, mullite, spinel, olivine, sericite, bentonite, and mica, or artificial materials thereof. Further, the heat resistant particles may be fine particles which are provided with electrical insulating properties by surface-treating the surfaces of the conductive fine particles such as metal fine particles, oxide fine particles such as $SnO_2$ and indium-tin oxide (ITO), and carbonaceous fine particles such as carbon black and graphite with a material having electrical insulating properties (e.g., the material of the above-mentioned electric insulating inorganic particles). As heat resistant particles, $SiO_2$, $Al_2O_3$, and alumina-silica composite oxide are particularly preferred.

<Nonaqueous Electrolyte>

As the nonaqueous electrolyte, an electrolyte solution in which an electrolyte salt is dissolved in a nonaqueous solvent can be used. The separator is impregnated with the electrolyte solution in the case 11. The electrolyte solution is not limited and generally those which are proposed for use in lithium ion batteries or the like can be used. Examples of nonaqueous solvents to be used for the nonaqueous electrolyte include, but not limited to, one compound or a mixture of two or more of compounds of cyclic carbonate esters such as propylene carbonate, ethylene carbonate, butylene carbonate, chloroethylene carbonate, and vinylene carbonate; cyclic esters such as γ-butyrolactone and γ-valerolactone; chain carbonates such as dimethyl carbonate, diethyl carbonate, and ethylmethyl carbonates; chain esters such as methyl formate, methyl acetate, and methyl butyrate; tetrahydrofuran and derivatives thereof, ethers such as 1,3- dioxane, 1,4-dioxane, 1,2-dimethoxyethane, 1,4-dibutoxyethane, and methyl diglyme; nitriles such as acetonitrile and benzonitrile; dioxolan and derivatives thereof, and ethylene sulfide, sulfolane, sultone, and derivatives thereof. A publicly known additive may be added to the electrolyte solution.

Examples of the electrolyte salt include inorganic ionic salts containing one of lithium (Li), sodium (Na), and potassium (K) such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, and KSCN; and organic ionic salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearylsulfonate, lithium octylsulfonate, and lithium dodecylbenzenesulfonate, and these ionic compounds may be used singly or in combination of two or more of them.

Further, an ambient temperature molten salt or an ion liquid may be used as an electrolyte solution.

As the nonaqueous electrolyte, one which is solidified or gelled by impregnating a polymer gel with an electrolyte solution may be used.

Hereinafter, the present invention will be described in detail based on experiment examples. It is to be noted that the present invention is not limited by the following experiment examples at all.

Experiment Example 1

In Experiment Example 1, an energy storage element was housed inside a case main body opened upward. A positive electrode plate and a positive electrode terminal were connected, and a negative electrode plate and a negative electrode terminal were connected. Then an electrolyte solution was injected into the case main body, and a lid was welded to the case main body to produce an energy storage device.

The positive electrode plate was prepared as follows. As a positive active material, lithium-metal oxide having a D50 particle diameter of 4.5 μm and represented by the composition formula $LiNi_{1/3}Co_{1/3}Mn_{1/3}O_2$ was used. The particle diameter was measured with SALD-2200 (control software was Wing SALD-2200) manufactured by Shimadzu Corporation. 91 parts by mass of the positive active material, 4.5 parts by mass of acetylene black as a conduction aid, and 4.5 parts by mass of polyvinylidene fluoride as a positive electrode binder were mixed. Then, N-methylpyrrolidone was appropriately added to prepare a paste form to prepare a positive composite. This positive composite was applied onto both surfaces of a positive electrode foil made of an aluminum foil having a thickness of 15 μm. After drying the positive electrode foil, it was pressed with a roll press machine to prepare a positive electrode plate.

The negative electrode plate was prepared as follows. As a negative active material, hard carbon having a D50 particle diameter of 4.5 μm was used. The particle diameter was measured with SALD-2200 (control software was Wing SALD-2200) manufactured by Shimadzu Corporation. 93 parts by mass of the negative active material and 7 parts by mass of polyvinylidene fluoride as a negative electrode binder were mixed. Then, N-methylpyrrolidone (NMP) as a solvent was appropriately added to prepare a paste form to prepare a negative composite. This negative composite was applied onto both sides of a negative electrode foil made of a copper foil having a thickness of 10 μm. After drying the negative electrode foil, it was pressed with a roll press machine to prepare a negative electrode plate.

For a separator, one having a heat-resistant layer containing $Al_2O_3$ as heat resistant particles formed on one surface of a microporous polyethylene membrane was used.

The positive electrode plate, the separator, the negative electrode plate, and the separator which are respectively obtained as described above were sequentially overlaid and wound in a spiral form to produce a wound type energy storage element.

As the electrolyte solution, $LiPF_6$ was used as a solute, and a mixed solvent of propylene carbonate, dimethyl carbonate, and ethyl methyl carbonate was used as a solvent. The mixed solvent was prepared so that the volume ratio of each component was propylene carbonate:dimethyl carbonate:ethyl methyl carbonate=1:1:1. $LiPF_6$ was dissolved in this mixed solvent, and the concentration of $LiPF_6$ was adjusted to be 1 mol/L.

(Measurement of Pore Distribution)

Measurement of pore distribution by a mercury penetration method was carried out as follows. First, the energy storage device was disassembled, and the positive electrode plate and the negative electrode plate were sampled. As a sampled sample, one having a size of 2 cm×10 cm was sampled. These were washed with dimethyl carbonate and pretreated by vacuum drying at ambient temperature.

With respect to the sample prepared as described above, the differential pore volume ($cm^3$/g) was measured by a mercury penetration method according to JIS R 1655 using Micromeritics WIN 9400. In the measurement, the contact angle to the sample was set at 130°. The range of the measured pores was set to 0.006 to 20 μm.

Figure 3:
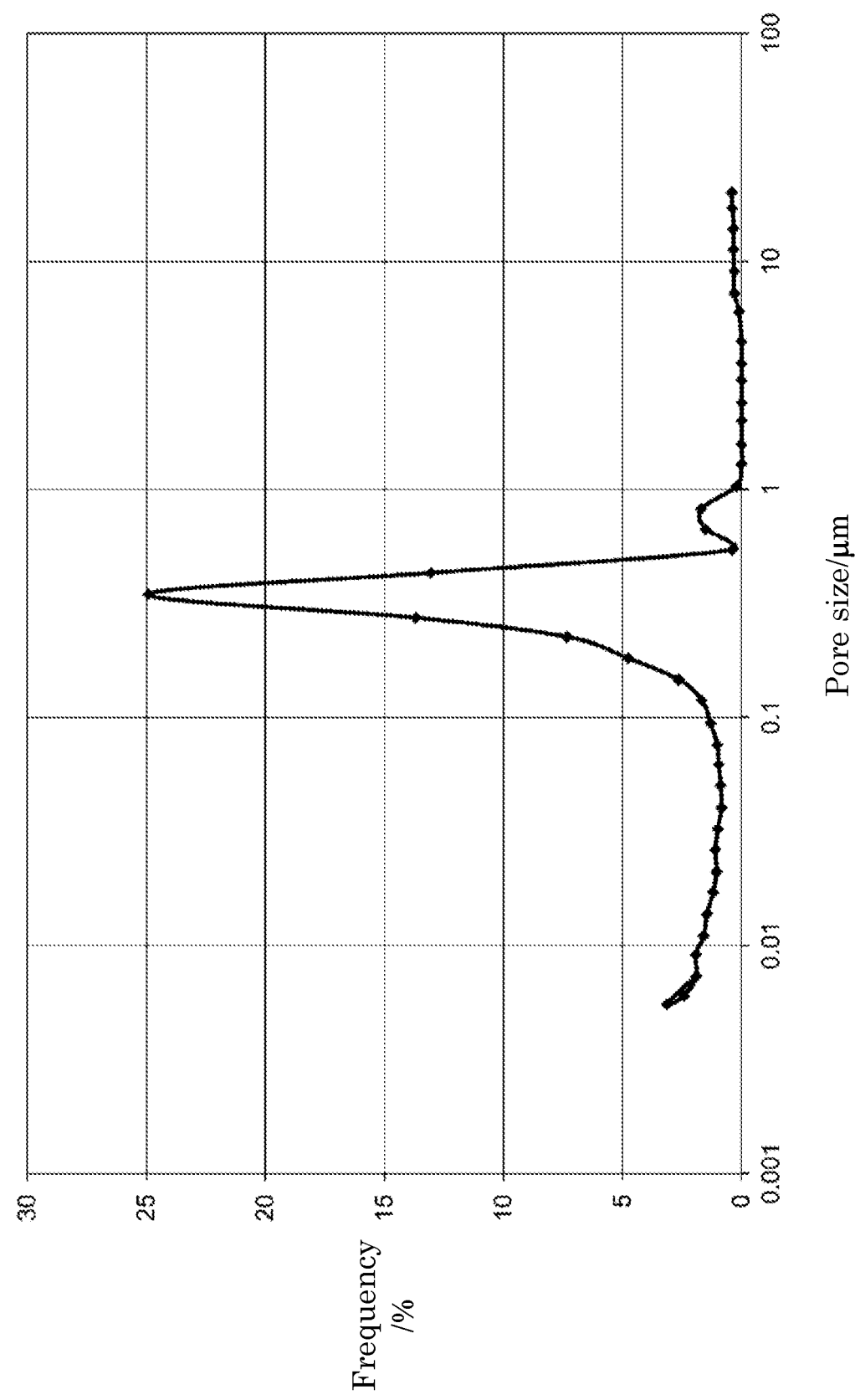
FIG. 3 is a graph of a differential pore volume measured for a negative composite layer according to Experiment Example 15.

The measured differential pore volumes were shown graphically and the peak pore size of the positive composite layer and the peak pore size of the negative composite layer were determined from the pore size at which the frequency was highest in the graphs. For example, a graph of the differential pore volume measured on the negative composite layer of Experiment Example 15 which will be described later was as shown in FIG. 3. In this case, since the most frequent pore size was 0.346 μm, the peak pore size in this experiment example was determined as 0.346 μm. Here, "frequency" corresponds to the value of the differential pore volume relative to the total pore volume in the measured range, and the unit is percentage (%).

The peak pore size of the composite layer can be varied by a technique of varying the pressing pressure at the time of forming the composite layer, varying the particle size of the active material, varying the ratio of the active material, the binder, and the conduction aid in the composite layer, or the like.

(Preparation for Initial Power Performance Test and Endurance Capacity Retention Ratio Test)

The initial discharge capacity C1 [Ah] of the energy storage device was measured by conducting a constant current constant voltage charge of a charge current of 5 A and 4.2 V for 3 hours in a thermostatic chamber at 25° C. on the produced energy storage device, and then, after stopping for 10 minutes, performing a constant current discharge at a discharge current of 5 A to 2.4 V.

(Initial Power Performance Test)

Thereafter, SOC (State Of Charge) of the energy storage device was adjusted to 50% by charging 50% of the discharge capacity C1 of the energy storage device. Then, continuous energization was carried out in an environment of minus 10° C. for 10 seconds under the condition that the current value was 30 C1 [A]. Examples in which continuous energization could be conducted were rated as "O", and examples in which continuous energization could not be conducted were rated as "X".

(Endurance Capacity Retention Ratio Test)

Then, the energy storage device was subjected to a constant current discharge at a discharge current of 5 A to 2.4 V, and then charged to 15% of the discharge capacity C1 to adjust the SOC of the energy storage device to 15%.

The above energy storage device was placed in a thermostatic chamber at 55° C. and subjected to a cycle test by repeating constant current charge and constant current discharge for 1000 hours in total under the condition that the current value was 8C1 [A]. During constant current charging, charging was performed until the SOC reached 85%, and discharging was performed until the SOC reached 15% during constant current discharging.

The constant current constant voltage charge of a charge current of 5 A and 4.2 V was carried out for 3 hours in a thermostatic chamber at 25° C. on the energy storage device after the above-mentioned cycle test, and the discharge capacity C2 [Ah] of the energy storage device after the cycle test was measured by performing a constant current discharge at a discharge current of 5 A to 2.4 V after stopping for 10 minutes.

The endurance capacity retention ratio R [%]=C2/C1×100 was calculated from the initial capacity C1 of the energy storage device and the discharge capacity C2 after the cycle test of the energy storage device.

For the energy storage device according to Experiment Example 1, the configurations of the positive electrode and the negative electrode and the measurement results are summarized in Table 1. In the table, "positive electrode D50" means "D50 particle diameter of positive active material", "positive electrode peak pore size" means "peak pore size of positive composite layer", "negative electrode D50" means "D50 particle diameter of the negative active material", "negative electrode peak pore size" means "peak pore size of the negative composite layer", and "Rp/Rn" means to "a ratio Rp/Rn of the peak pore size of the positive composite layer to the peak pore size of the negative composite layer".

Experiment Examples 2 to 46

With respect to Experiment Examples 2 to 46, the positive electrode and the negative electrode were configured as shown in Table 1 and the endurance capacity retention ratio and initial power performance were evaluated in the same manner as in Experiment Example 1, and these values are summarized in Table 1.

Note that the endurance capacity retention ratio was performed only for some of the energy storage devices of Experiment Examples 1 to 46. For the experiment examples in which the endurance capacity retention ratio test was conducted, numerical values are described in the column of endurance capacity retention ratio, and for the experiment examples not subjected to the test, "—" is indicated in the endurance capacity retention ratio column.

TABLE 1

| Experiment Example | Positive Electrode D50/ μm | Positive Electrode Peak Pore Size/ μm | Negative Electrode D50/ μm | Negative Electrode Peak Pore Size/ μm | Rp/Rn | Endurance Capacity Retention Ratio/ % | Initial Power Performance |
|---|---|---|---|---|---|---|---|
| 1 | 4.5 | 0.545 | 4.5 | 0.545 | 1.000 | 68 | o |
| 2 | 4.5 | 0.545 | 4.5 | 0.431 | 1.264 | 69 | o |
| 3 | 4.5 | 0.545 | 4.5 | 0.346 | 1.576 | — | o |
| 4 | 4.5 | 0.545 | 4.5 | 0.285 | 1.912 | — | o |
| 5 | 4.5 | 0.545 | 4.5 | 0.225 | 2.422 | — | o |
| 6 | 4.5 | 0.545 | 4.5 | 0.181 | 3.004 | — | x |
| 7 | 4.5 | 0.431 | 4.5 | 0.545 | 0.791 | 73 | o |
| 8 | 4.5 | 0.431 | 4.5 | 0.431 | 1.000 | 90 | o |
| 9 | 4.5 | 0.431 | 4.5 | 0.346 | 1.246 | 91 | o |
| 10 | 4.5 | 0.431 | 4.5 | 0.285 | 1.512 | 87 | o |
| 11 | 4.5 | 0.431 | 4.5 | 0.225 | 1.916 | — | o |
| 12 | 4.5 | 0.431 | 4.5 | 0.181 | 2.376 | — | x |
| 13 | 4.5 | 0.346 | 4.5 | 0.545 | 0.635 | 74 | o |
| 14 | 4.5 | 0.346 | 4.5 | 0.431 | 0.802 | 91 | o |
| 15 | 4.5 | 0.346 | 4.5 | 0.346 | 1.000 | 93 | o |
| 16 | 4.5 | 0.346 | 4.5 | 0.285 | 1.213 | 92 | o |
| 17 | 4.5 | 0.346 | 4.5 | 0.225 | 1.537 | 89 | o |
| 18 | 4.5 | 0.346 | 4.5 | 0.181 | 1.906 | — | x |
| 19 | 4.5 | 0.285 | 4.5 | 0.545 | 0.523 | — | o |
| 20 | 4.5 | 0.285 | 4.5 | 0.431 | 0.661 | 84 | o |
| 21 | 4.5 | 0.285 | 4.5 | 0.346 | 0.824 | 90 | o |
| 22 | 4.5 | 0.285 | 4.5 | 0.285 | 1.000 | 93 | o |
| 23 | 4.5 | 0.285 | 4.5 | 0.225 | 1.267 | 92 | o |
| 24 | 4.5 | 0.285 | 4.5 | 0.181 | 1.571 | 88 | x |
| 25 | 4.5 | 0.225 | 4.5 | 0.545 | 0.413 | — | o |
| 26 | 4.5 | 0.225 | 4.5 | 0.431 | 0.522 | — | o |
| 27 | 4.5 | 0.225 | 4.5 | 0.346 | 0.651 | 87 | o |
| 28 | 4.5 | 0.225 | 4.5 | 0.285 | 0.789 | 91 | o |
| 29 | 4.5 | 0.225 | 4.5 | 0.225 | 1.000 | 94 | o |
| 30 | 4.5 | 0.225 | 4.5 | 0.181 | 1.240 | 95 | x |
| 31 | 4.5 | 0.181 | 4.5 | 0.545 | 0.333 | — | x |
| 32 | 4.5 | 0.181 | 4.5 | 0.431 | 0.421 | — | x |
| 33 | 4.5 | 0.181 | 4.5 | 0.346 | 0.525 | 71 | x |
| 34 | 4.5 | 0.181 | 4.5 | 0.285 | 0.636 | 83 | x |
| 35 | 4.5 | 0.181 | 4.5 | 0.225 | 0.806 | 90 | x |
| 36 | 4.5 | 0.181 | 4.5 | 0.181 | 1.000 | 94 | x |
| 37 | 6 | 0.510 | 4.5 | 0.431 | 1.183 | — | x |

TABLE 1-continued

| Experiment Example | Positive Electrode D50/ μm | Positive Electrode Peak Pore Size/ μm | Negative Electrode D50/ μm | Negative Electrode Peak Pore Size/ μm | Rp/Rn | Endurance Capacity Retention Ratio/ % | Initial Power Performance |
|---|---|---|---|---|---|---|---|
| 38 | 6 | 0.510 | 4.5 | 0.346 | 1.475 | — | x |
| 39 | 6 | 0.405 | 4.5 | 0.346 | 1.171 | — | x |
| 40 | 6 | 0.405 | 4.5 | 0.285 | 1.421 | — | x |
| 41 | 6 | 0.405 | 4.5 | 0.225 | 1.800 | — | x |
| 42 | 4.5 | 0.431 | 8 | 0.545 | 0.791 | — | x |
| 43 | 4.5 | 0.346 | 8 | 0.545 | 0.635 | — | x |
| 44 | 4.5 | 0.346 | 8 | 0.431 | 0.802 | — | x |
| 45 | 4.5 | 0.285 | 8 | 0.431 | 0.661 | — | x |
| 46 | 4.5 | 0.225 | 8 | 0.431 | 0.522 | — | x |

Among the experiment examples described in Table 1, Experiment Examples 8 to 10, 14 to 17, 20 to 24, 27 to 30, 34 to 36, 39 to 40, and 42 to 45 are examples according to the techniques described herein. Experiment examples 1 to 7, 11 to 13, 18 to 19, 25 to 26, 31 to 33, 37 to 38, 41 and 46 are comparative examples.

(Endurance Capacity Retention Ratio)

The endurance capacity retention ratio will be examined below. Among the experiment examples described in Table 1, those in which the endurance capacity retention ratio was measured were extracted in Table 2.

TABLE 2

| Experiment Example | Positive Electrode D50/ μm | Positive Electrode Peak Pore Size/ μm | Negative Electrode D50/ μm | Negative Electrode Peak Pore Size/ μm | Rp/Rn | Endurance Capacity Retention Ratio/ % | Initial Power Performance |
|---|---|---|---|---|---|---|---|
| 1 | 4.5 | 0.545 | 4.5 | 0.545 | 1.000 | 68 | ○ |
| 2 | 4.5 | 0.545 | 4.5 | 0.431 | 1.264 | 69 | ○ |
| 7 | 4.5 | 0.431 | 4.5 | 0.545 | 0.791 | 73 | ○ |
| 8 | 4.5 | 0.431 | 4.5 | 0.431 | 1.000 | 90 | ○ |
| 9 | 4.5 | 0.431 | 4.5 | 0.346 | 1.246 | 91 | ○ |
| 10 | 4.5 | 0.431 | 4.5 | 0.285 | 1.512 | 87 | ○ |
| 13 | 4.5 | 0.346 | 4.5 | 0.545 | 0.635 | 74 | ○ |
| 14 | 4.5 | 0.346 | 4.5 | 0.431 | 0.802 | 91 | ○ |
| 15 | 4.5 | 0.346 | 4.5 | 0.346 | 1.000 | 93 | ○ |
| 16 | 4.5 | 0.346 | 4.5 | 0.285 | 1.213 | 92 | ○ |
| 17 | 4.5 | 0.346 | 4.5 | 0.225 | 1.537 | 89 | ○ |
| 20 | 4.5 | 0.285 | 4.5 | 0.431 | 0.661 | 84 | ○ |
| 21 | 4.5 | 0.285 | 4.5 | 0.346 | 0.824 | 90 | ○ |
| 22 | 4.5 | 0.285 | 4.5 | 0.285 | 1.000 | 93 | ○ |
| 23 | 4.5 | 0.285 | 4.5 | 0.225 | 1.267 | 92 | ○ |
| 24 | 4.5 | 0.285 | 4.5 | 0.181 | 1.571 | 88 | x |
| 27 | 4.5 | 0.225 | 4.5 | 0.346 | 0.651 | 87 | ○ |
| 28 | 4.5 | 0.225 | 4.5 | 0.285 | 0.789 | 91 | ○ |
| 29 | 4.5 | 0.225 | 4.5 | 0.225 | 1.000 | 94 | ○ |
| 30 | 4.5 | 0.225 | 4.5 | 0.181 | 1.240 | 95 | x |
| 33 | 4.5 | 0.181 | 4.5 | 0.346 | 0.525 | 71 | x |
| 34 | 4.5 | 0.181 | 4.5 | 0.285 | 0.636 | 83 | x |
| 35 | 4.5 | 0.181 | 4.5 | 0.225 | 0.806 | 90 | x |
| 36 | 4.5 | 0.181 | 4.5 | 0.181 | 1.000 | 94 | x |

In Experiment Examples 1 and 2 in which the peak pore sizes Rp of the positive composite layer were larger than 0.5 μm, the endurance capacity retention ratios were a relatively low value of 68% to 69%. In Experiment Examples 7 and 13 in which the peak pore sizes Rn of the negative composite layer were larger than 0.5 μm, the endurance capacity retention ratios were a relatively low value of 73% to 74%. In Experiment Example 33 in which the ratio Rp/Rn of the peak pore size of the positive composite layer to the peak pore size of the negative composite layer was smaller than 0.6, the endurance capacity retention ratio was a relatively low value of 71%. Thus, in Experiment Examples 1 to 2, 7, 13, and 33, which are comparative examples, the endurance capacity retention ratio was only 74% at the maximum.

In contrary, in Experiment Examples 8 to 10, 14 to 17, 20 to 24, 27 to 30, and 34 to 36 in which when the peak pore sizes Rp of the positive composite layer were 0.5 μm or less, the peak pore size Rn of the negative composite layer were 0.5 μm or less, and the ratio Rp/Rn of the peak pore size of the positive composite layer to the peak pore size of the negative composite layer were 0.60 or more and 1.70 or less, the endurance capacity retention ratios exhibited 83% or more (see Experiment Example 34) and exhibited higher values than comparative examples (Experiment Examples 1 to 2, 7, 13, and 33).

Further, in Experiment Examples 8 to 9, 14 to 16, 21 to 23, 28 to 30, and 35 to 36 in which the ratios Rp/Rn of the peak pore size of the positive composite layer to the peak pore size of the negative composite layer were 0.67 or more and 1.50 or less, the endurance capacity retention ratios were 90% or more (Experiment Examples 8, 21, and 35) and exhibited higher values than comparative examples (Experiment Examples 1 to 2, 7, 13, and 33).

Further, in Experiment Examples 8 to 9, 14 to 16, 21 to 23, 28 to 30, and 35 to 36 in which the ratio Rp/Rn of the peak pore size of the positive composite layer to the peak pore size of the negative composite layer was 0.78 or more and 1.27 or less, the endurance capacity retention ratios were 90% (Experiment Examples 8, 21, and 35) or more and exhibited higher values than comparative examples (Experiment Examples 1 to 2, 7, 13, and 33).

Further, in Experiment Examples 8 to 9, 15 to 16, 22 to 23, 29 to 30 and 36, in which the ratios Rp/Rn of the peak pore size of the positive composite layer to the peak pore size of the negative composite layer were 0.98 or more and 1.27 or less, the endurance capacity retention ratios were 90% or more (Experiment Examples 8, 21, and 35) and exhibited higher values than comparative examples (Experiment Examples 1 to 2, 7, 13, and 33).

It is considered that the above results are based on the following reasons. First, by setting the ratio Rp/Rn of the peak pore size of the positive composite layer to the peak pore size of the negative composite layer to be 0.60 or more and 1.70 or less, the peak pore size Rp of the positive composite layer and the peak pore size Rn of the negative composite layer can be relatively close to each other. Thereby, it possible to make the diffusion rate of lithium ions in the positive composite layer and the diffusion rate of lithium ions in the negative composite layer relatively close to each other. Then, the lithium ions are prevented from staying in the positive composite layer or the negative composite layer during charging or discharging of the energy storage device. As a result, occurrence of large polarization due to uneven distribution of lithium ions is suppressed in either the positive electrode or the negative electrode.

As described above, the occurrence of large polarization in one of the positive electrode and the negative electrode is suppressed, so that the potential in the positive composite layer or the negative composite layer can be set to be within the designed range. Thereby, problems such as precipitation of lithium metal, cracking of the composite layer, and excessive decomposition of the nonaqueous electrolyte can be suppressed. As a result, it is possible to improve the endurance capacity retention ratio of the energy storage device.

Further, by setting the peak pore size Rp of the positive composite layer and the peak pore size Rn of the negative composite layer to 0.5 μm or less, the endurance capacity retention ratio can be improved. When the peak pore size Rp of the positive composite layer and the peak pore size Rn of the negative composite layer are larger than 0.5 μm, the voids among the active materials in the composite layer increase, and therefore the electric resistance value increases in the composite layers. Then, it is presumed that large polarization occurs locally in a part of the composite layer.

Further, since the ratio Rp/Rn of the peak pore size of the positive composite layer to the peak pore size of the negative composite layer is 0.67 or more and 1.50 or less, whereby the endurance capacity retention ratio of the energy storage device can be further improved. The reason for this is that the difference between the peak pore size Rp of the positive composite layer and the peak pore size Rn of the negative composite layer becomes smaller, so that the polarization in the positive composite layer and the negative composite layer can be further suppressed.

Further, since the ratio Rp/Rn of the peak pore size of the positive composite layer to the peak pore size of the negative composite layer is 0.78 or more and 1.27 or less, whereby the endurance capacity retention ratio of the energy storage device can be further improved. The reason for this is that the difference between the peak pore size Rp of the positive composite layer and the peak pore size Rn of the negative composite layer is further reduced, so that the polarization in the positive composite layer and the negative composite layer can be further suppressed.

Further, since the ratio Rp/Rn of the peak pore size of the positive composite layer to the peak pore size of the negative composite layer is 0.98 or more and 1.27 or less, whereby the endurance capacity retention ratio of the energy storage device can be particularly improved. The reason for this is that the difference between the peak pore size Rp of the positive composite layer and the peak pore size Rn of the negative composite layer becomes particularly small, so that the polarization in the positive composite layer and the negative composite layer can be particularly suppressed.

(Initial Power Performance)

Next, the initial power performance will be considered (see Table 1). In Experiment Examples 37 to 41 in which the D50 particle diameters of the positive active material were larger than 5 μm, continuous energization could not be performed for 10 seconds at 30 C in the initial power performance test. In the positive active material having a D50 particle diameter of 6 μm, it was difficult to produce a positive composite layer having a peak pore size Rp of less than 0.4 μm.

In Experiment Examples 42 to 46 in which the D50 particle diameters of the negative active material were larger than 5 μm, continuous energization could not be performed for 10 seconds at 30 C. In the negative active material having a D50 particle diameter of 8 μm, it was difficult to produce a negative composite layer having a peak pore size Rn of less than 0.4 μm.

Further, in Experiment Examples 6, 12, 18, 24, and 30 in which the peak pore sizes of the negative composite layers were smaller than 0.2 μm, continuous energization could not be performed at 30 C for 10 seconds.

In Experiment Examples 31 to 36 in which the peak pore sizes of the positive composite layers were smaller than 0.2 μm, continuous energization could not be performed for 10 seconds at 30 C.

In contrast, in Experiment Examples 1 to 5, 7 to 11, 13 to 17, 19 to 23, and 25 to 29 in which the D50 particle diameters of the positive active materials were 5 μm or less, the D50 particle diameters of the negative active material were 5 μm or less, the peak pore sizes of the positive composite layers were 0.2 μm or more, and the peak pore sizes of the negative composite layers were 0.2 μm or more, continuous energization could be performed for 10 seconds at 30 C. As described above, in the energy storage device according to the above experiment example, the initial power performance can be improved.

This is thought to be due to the following reason. First, by setting the D50 particle diameter of the positive active material and the D50 particle diameter of the negative active material to 5 μm or less, it is possible to improve the power of the positive active material and the negative active material.

Further, by setting the peak pore size of the positive composite layer and the peak pore size of the negative composite layer to 0.2 μm or more, it is possible to improve the lithium ion diffusion performance in the positive composite layer and the negative composite layer. The reason for this is that setting the peak pore size in the positive composite layer and the peak pore size in the negative composite layer to 0.2 μm or more allows the nonaqueous electrolyte to be sufficiently diffused into the pores. It is thought that as a result, lithium ions can be sufficiently diffused into the pores of the positive composite layer and the negative composite layer. Therefore, uneven distribution of lithium ions in the positive composite layer or the negative composite layer is suppressed, so that the high power performance of the energy storage device can be improved.

Also, mass productivity of the positive active material and the negative active material can be improved when a D50 particle diameter of the positive active material is 2 μm or more and a D50 particle diameter of the negative active material is 2 μm or more. That is because it becomes difficult to handle since the positive active material and the negative active material are likely to scatter when the D50 particle diameter of the positive active material and the D50 particle diameter of the negative active material becomes smaller than 2 μm.

Other Embodiments

The technology described in the present specification is not limited to the embodiment described by the above description and the drawings, and the following embodiments are also included in the scope of the technology described in the present specification.

(1) In this embodiment, a lithium ion secondary battery is used as the energy storage device, but the present invention is not limited to this. Any energy storage device causing lithium ion diffusion, such as a lithium ion capacitor, can be used.

(2) In the present embodiment, a square cylindrical type energy storage device is used, but the present invention is not limited thereto, and an energy storage device having an arbitrary shape such as a circular cylindrical shape or a disk shape can be used as required.

(3) The energy storage device (for example, a battery) may be used for the energy storage apparatus (a battery module in the case where the energy storage device is a battery). The energy storage apparatus may be configured to include at least two energy storage devices and a bus bar member for electrically connecting the two energy storage devices to each other. In this case, the energy storage apparatus may include at least one energy storage device according to the present embodiment.

(4) In the present embodiment, the energy storage element 18 is of a wound type, but it is not limited to this. The energy storage element 18 may be of a so-called laminated type in which the positive electrode plate 12, the separator, and the negative electrode plate 13 are layered in this order.

DESCRIPTION OF REFERENCE SIGNS

10: Energy storage device
12: Positive electrode plate
13: Negative electrode plate

The invention claimed is:
1. An energy storage device comprising:
a positive electrode containing a positive composite layerincluding a positive active material capable of occluding and releasinga lithium ion; and
a negative electrode containing a negative composite layer including a negative active material capable of occluding and releasinga lithium ion,
wherein the positive active material comprises a lithium metal oxide represented by $LiNi_aCo_bMn_cM_dO_2$ where M is an element ora combination of two or more elements selected from a group consisting of B, Mg, Al, Ti, V, Zn, Y, Zr, Mo and W, and $0 \leq (a, b, c, d) \leq 1$ and $a+b+c+d=1$ are satisfied,
wherein the negative active material comprises an amorphous carbon including at least one selected from the group consisting of graphitizable carbon and non-graphitizable carbon,
wherein the amorphous carbon is defined as a carbon in which interplanarspacing of a (002) plane measured from a wide angle X-ray diffraction in a discharge state of the negative electrode is 0.340 or more,
a peak pore diameter Rp of the positive composite layer in a pore distribution measured by a mercury penetration method is 0.2 μm or more and 0.5 μm or less,
a peak pore diameter Rn of the negative composite layer in a pore distribution measured by a mercury penetration method is 0.2 μm or more and 0.5 μm or less,
a ratio Rp/Rn of the peak pore diameter of the positive composite layerto the peak pore diameterof the negative composite layer is 0.60 or more and 1.70 or less,
a D50 particle diameterof the positive active material is 5 μm or less, and
a D50 particle diameterof the negative active material is 5 μm or less.
2. The energy storage device according to claim 1, wherein the ratio Rp/Rn of the peak pore diameter of the positive composite layer to the peak pore diameter of the negative composite layer is 0.67 or more and 1.50 or less.
3. The energy storage device according to claim 1, wherein the ratio Rp/Rn of the peak pore diameter of the positive composite layer to the peak pore diameter of the negative composite layer is 0.78 or more and 1.27 or less.
4. The energy storage device according to claim 1, wherein the ratio Rp/Rn of the peak pore diameter of the positive composite layer to the peak pore diameter of the negative composite layer is 0.98 or more and 1.27 or less.
5. The energy storage device according to claim 1,
wherein the D50 particle diameter of the positive active material is 2 μm or more and 5 μm or less, and
the D50 particle diameter of the negative active material is 2 μm or more and 5 μm or less.
6. The energy storage device according to claim 1, wherein the negative active material contains non-graphitizable carbon.

* * * * *